United States Patent [19]
Hayashi et al.

[11] Patent Number: 6,035,136
[45] Date of Patent: Mar. 7, 2000

[54] ZOOM LENS BARREL

[75] Inventors: Shigeo Hayashi, Okaya; Masaaki Daigaku, Tama; Naoki Fuji, Hachioji, all of Japan

[73] Assignee: Olympus Optical Co., Ltd., Tokyo, Japan

[21] Appl. No.: 09/206,442

[22] Filed: Dec. 7, 1998

[30] Foreign Application Priority Data

Dec. 10, 1997 [JP] Japan .................................. 9-340187

[51] Int. Cl.⁷ .................................................. G03B 17/00
[52] U.S. Cl. ............................ 396/72; 396/85; 396/144; 396/348; 396/349; 359/700
[58] Field of Search .................................. 396/85, 83, 72, 396/90, 144, 349, 348; 359/700, 696, 694

[56] References Cited

U.S. PATENT DOCUMENTS

| | | | |
|---|---|---|---|
| 4,322,150 | 3/1982 | Kamata et al. | 396/79 |
| 4,974,949 | 12/1990 | Tanaka | 396/83 |
| 5,014,077 | 5/1991 | Yomogizawa et al. | 396/349 |
| 5,144,493 | 9/1992 | Nomura | 396/75 |
| 5,198,932 | 3/1993 | Takamura | 396/85 |
| 5,270,868 | 12/1993 | Nomura | 396/79 |
| 5,293,192 | 3/1994 | Akitake et al. | 359/700 |
| 5,515,129 | 5/1996 | Miyazawa et al. | 396/349 |
| 5,764,937 | 6/1998 | Machida | 396/349 |

FOREIGN PATENT DOCUMENTS 62-112109  5/1987  Japan .

*Primary Examiner*—Russell Adams
*Attorney, Agent, or Firm*—Louis Weinstein

[57] ABSTRACT

A zoom lens barrel is intended to ensure precision in dimensions for a cam groove and contribute to realization of a compact and lightweight design and reduction in cost of manufacturing. The zoom lens barrel has a cam cylinder that is a cam member having a first cam groove and second cam groove, and a lens frame having a first cam pin to be engaged with the first cam groove, and a second cam pin to be engaged with the second cam groove. When the first cam pin formed on the lens frame moves along the first cam groove, the lens frame moves over a power varying zone that is a first zone in the direction of an optical axis. When the second cam pin formed on the lens frame moves along the second cam groove, the lens frame moves over a collapsing zone that is a second zone in the direction of the optical axis.

14 Claims, 9 Drawing Sheets

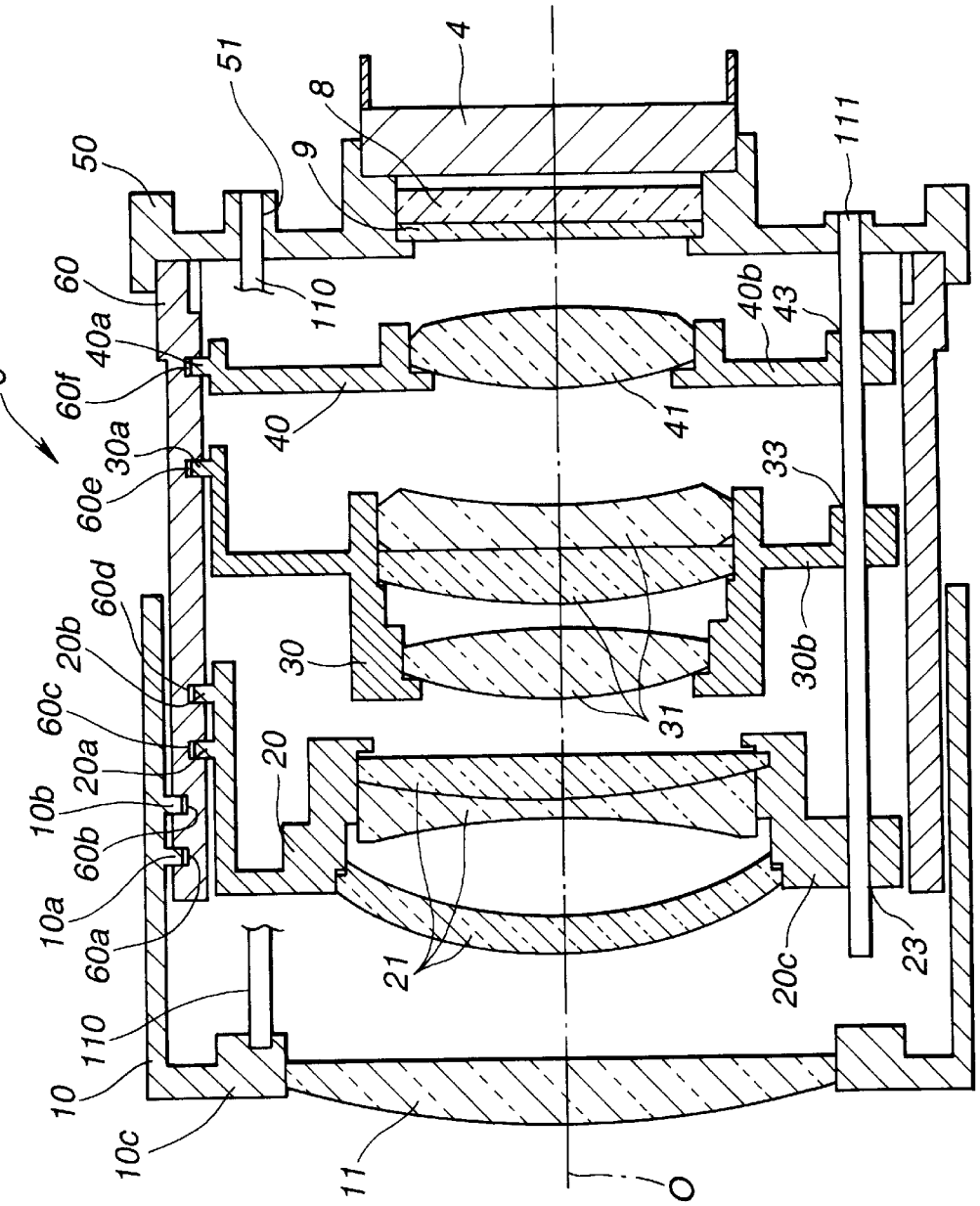

ZOOM LENS BARREL

BACKGROUND OF THE INVENTION

1. Field of the Invention

The present invention relates to a zoom lens barrel, or more particularly, to a mechanism for a zoom lens barrel capable of continuously varying the focal length of a photographic optical system.

2. Description of the Related Art

In the past, a variable-power lens (hereinafter zoom lens) capable of continuously varying the focal length of a photographic optical system, which realizes the variable-power lens, has generally been employed in photographic apparatuses in practice. The photographic apparatuses include a compact camera for carrying out photography using a silver film, and an electronic still camera (hereinafter electronic camera) for recording a picture signal or picture information output from an imaging means such as a CCD (hereinafter these types of cameras are generically called cameras). In recent years, there has been an increasing demand for a zoom lens offering a higher power. The overall length of a lens barrel for holding a photographic optical system realizing the zoom lens (photographic lenses) tends to get longer with an increase in power or focal length.

In this case, when the overall length of the lens barrel increases, portability that is a great merit of general compact cameras will be impaired terribly. For this reason, a so-called collapsible zoom lens barrel has been widely adopted and has generally prevailed. The collapsible zoom lens barrel is such that: when a camera is unused or carried, the lens barrel is moved inside a camera body so that it will jut out of the camera body by the smallest possible magnitude.

On the other hand, talking of the camera, an automated camera having an automatic focus (AF) unit or automatic exposure (AE) control unit for autonomously adjusting a focal point or exposure value has widely prevailed. Such an automated camera realizes automatic focus (AF) or automatic exposure control (AE).

In the case of a collapsible zoom lens barrel adopted for such an automated camera, a group of photographic lenses constituting a photographic optical system is composed of two to four groups of lenses. The plurality of groups of photographic lenses is borne by lens frames provided respectively for the groups of photographic lenses. The zoom lens barrel is therefore composed of the same number of lens frames as the number of groups of photographic lenses.

The plurality of lens frames is moved in the direction of an optical axis of photographic lenses by a given distance by means of a cam cylinder that rotates with the optical axis as a center. Movements to be made by the lens frames at this time are a movement within a power varying (zooming) zone in which power variation is carried out, and a movement within a collapsing zone in which collapse is carried out. The cam cylinder is designed to move over the two different zones.

As for the cam cylinder, a form composed of two separate cam cylinders of a zooming cam cylinder for realizing a power varying zone and a collapsing cam cylinder for realizing a collapsing zone has been adopted in the past. Moreover, there is a trend toward a compact camera body. Therefore, a form in which a cam realizing the power varying zone and a cam realizing the collapsing zone are formed continuously in one cam cylinder has often been adopted these days.

On the other hand, there is a macro zoom lens barrel offering a nearby photography function (macro zooming function). A generally adopted macro zoom lens barrel is such that a cam realizing a power varying zone and a cam realizing a macro zooming zone are formed continuously in one cam cylinder. This lens barrel enables a lens frame to move over both zones.

As mentioned above, in a zoom lens barrel that has been used generally in practice, two cam grooves delineated by different cam curves are cut continuously in one cam cylinder. The cam cylinder is turned in order to induce two movements.

Using this type of zoom lens barrel, when the cylindrical cam is turned, a desired lens frame is moved by the cam realizing a power varying zone. The desired lens frame is thus moved for varying the power of the photographic lenses. Moreover, the lens frame may be moved continuously for causing the zoom lens barrel to collapse or make any other movement. A moving means for allowing the zoom lens barrel to collapse or make movements other than the movements for varying the power can be excluded. This brings about the merit that the zoom lens barrel and a camera employing the zoom lens barrel can be designed to be compact and lightweight and to cost least.

FIG. 10 is a diagram showing the development of a cam cylinder included in a collapsible zoom lens barrel to which the foregoing form is adapted. Movements to be made by a photographic optical system that is moved by the cam cylinder will be described below. The development of FIG. 10 shows the cam cylinder seen from the inner circumferential side thereof.

FIG. 9A, FIG. 9B, and FIG. 9C schematically show the positions of groups of photographic lenses associated with the states of a conventional zoom lens barrel. FIG. 9A shows a collapsed state in which the groups of photographic lenses are located at stored positions in a non-photographic state. FIG. 9B shows a state in which the groups of photographic lenses are located at short-focus (or wide-angle) positions in a photographic state. FIG. 9C shows a state in which the groups of photographic lenses are located at long-focus (or telephotographic) positions in the photographic state and. To begin with, the positional relationship among the groups of photographic lenses contained in the zoom lens barrel will be described in relation to the states of the groups of photographic lenses shown in FIG. 9A, FIG. 9B, and FIG. 9C.

The photographic optical system contained in the zoom lens barrel is composed of four groups of photographic lenses. The groups of photographic lenses are arranged in order of a first group of lenses 11, a second group of lenses 21, a third group of lenses 31, and a fourth group of lenses 41, moving from the side of an object 101 towards the camera. The first to fourth groups of lenses 11, 21, 31, and 41 are borne separately by four lens frames. The four lens frames are designed to move to given positions with the turn of the cam cylinder that will be described later (See FIG. 10). In FIG. 9A, FIG. 9B, and FIG. 9c, the four lens frames and cam cylinder 160 are not shown for fear of complication of the drawing.

To begin with, assume that the zoom lens barrel is placed in the collapsed state (stored position) as shown in FIG. 9A. The main power supply of a camera in which the lens barrel is incorporated is turned on and the camera is shifted to a photographic mode. The cam cylinder 160 (See FIG. 10) of the lens barrel of the camera is then turned, whereby the groups of photographic lenses are moved to enter a readyto-photograph state shown in FIG. 9B (short-focus positions in the photographic state). At this time, only the first group of lenses 11 and second group of lenses 21 are moved but the third group of lenses 31 and fourth group of lenses 41 are not moved.

In the photographic state, when a movement is made to carry out power variation (zooming), the groups of photographic lenses are moved between the short-focus positions shown in FIG. 9B and the long-focus positions shown in FIG. 9C. However, when the movement is made to carry out power variation, the first group of lenses 11 is not moved.

In the photographic state, the main power supply of the camera is turned off in order to terminate photographic movements. This causes the groups of photographic lenses to move to the stored positions shown in FIG. 9A by way of the short-focus positions shown in FIG. 9B. The groups of photographic lenses are thus placed in the collapsed state.

Thus, the groups of photographic lenses are moved owing to the operation of the cam cylinder 160 (See FIG. 10).

Next, the operation of the cam cylinder 160 will be described in conjunction with FIG. 10.

The cam cylinder 160 causing the lens frames to move is realized with a hollowed cylinder. A plurality of cam grooves is formed in the outer circumference or inner circumference of the cylinder. The lens frames are arranged at given positions on the inner and outer circumferences of the cam cylinder 160 so that the lens frames can slide freely. Given cam pins are planted on the outer or inner circumferences of the lens frames. The given cam pins are engaged with the given cam grooves in the cam cylinder 160.

FIG. 10 shows, as mentioned above, the development of the cam cylinder 160 in the collapsible zoom lens barrel. The plurality of cam grooves formed in the circumferences of the cam cylinder 160 is illustrated. 0°, 90°, 180°, 270°, and 360° in FIG. 10 means the angles of rotation of the cam cylinder 160. Moreover, the cam cylinder 160 is selectively turned in the directions of arrows X in FIG. 10. The lens frames are moved in the direction of an optical axis (directions of arrows Y). Herein, the direction of arrow Y1 is a direction towards an object.

The cam cylinder 160 has a first cam groove 161 (indicated with a dashed line), which causes the first lens frame to move, formed in the outer circumference thereof. A second cam groove 162, third cam groove 163, and fourth cam groove 164 are formed in the inner circumference thereof.

The detailed shapes of the thus formed cam grooves in the zoom lens barrel will be described by taking the second cam groove 162 for instance.

The second cam groove 162 is realized by continuously forming grooves in a power varying zone cam Zu and a collapsing zone cam Co. A cam curve delineating the second cam groove 162 is coincident with the lens frame, and has the same angle as the angle of rotation of the cam cylinder 160.

A terminal end C2 of the groove in the collapsing zone cam Co is equivalent to the stored position in the collapsed state shown in FIG. 9A. Moreover, a full wide-angle position W2 that is the position of one end of the groove in the power varying zone cam Zu is equivalent to the short-focus position shown in FIG. 9B. The other end T2 thereof is equivalent to the long-focus position shown in FIG. 9C. A zone between the short-focus and long-focus positions is a photographic zone.

The second cam groove 162 is realized with a groove having a given width with a cam curve as a center. A second cam pin 122 of the second lens frame is engaged with the groove 162. FIG. 10 shows a photographic state in which the second cam pin 122 is located at the short-focus position (full wide-angle position) W2 that is the position of one end of the groove in the power varying zone cam Zu. The same applies to the relationship between each cam groove and each cam pin, that is, between the first cam groove 161 and a first cam pin 112, between the third cam groove 163 and a third cam pin 132, and between the fourth cam groove 164 and a fourth cam pin 142.

Moreover, the lens frames are partly engaged with two guide shafts arranged parallel to the optical axis of the photographic lenses so that the lens frames can slide freely. The lens frames can thus be supported to be able to move only in the direction of the optical axis. The cam cylinder 160 is turned by a motor (not shown) designed to drive the lenses arranged in the camera body or lens barrel. The lens frames (groups of photographic lenses) are thus moved in the direction of the optical axis by the cam pins engaged with the cam grooves. Given positions to which the lens frames are moved are determined by the cam curves delineating the cam grooves.

As mentioned above, the zoom lens barrel has been used in the camera in the past. In the zoom lens barrel, the cam pins planted on the lens frames for separately holding the plurality of groups of photographic lens are engaged with the plurality of cam grooves formed in the cam cylinder. When the cam cylinder is turned by the motor, the zoom lens barrel is moved to collapse or to vary the power of the photographic lenses.

The cam cylinder has been created in the past by machining a metallic member. In recent years, the cam cylinder has been manufactured by performing, for example, injection molding using a member made of a reinforced plastic or the like. This is intended mainly to reduce the cost of manufacturing or realize a lightweight design.

As mentioned above, one cam cylinder may be used to manufacture a zoom lens barrel caused to make two different movements. For example, the zoom lens barrel is moved to collapse and moved for varying the power, or the zoom lens barrel is moved for varying the power and moved for carrying out macro zooming. In this case, injection molding may be adopted for manufacturing a cam cylinder that has a cam groove made by continuously forming grooves in a collapsing zone cam and power varying zone cam or in the power varying zone cam and a macro zooming zone cam. This poses problems, as described below.

A first problem lies in that since the cam groove in the cam cylinder is formed by employing a sliding die assembly, the opposed walls of the cam groove may not be parallel to each other. The opposed walls may be inclined mutually and the cam groove may be tapered. The cam pin to be engaged with the cam groove is accordingly tapered. However, since the cam groove is delineated with two cam curves for a power varying zone and collapsing zone respectively, the cone angle of the cam pin becomes unnecessarily large. The first problem is attributable to this fact.

The problem that when an attempt is made to form a cam groove by performing normal injection molding, the cam groove is tapered will be described below.

FIG. 11 is a side view of a cam cylinder having a typical shape, that is, having a cam groove formed in the outer circumference of a cylindrical member. FIG. 12, FIG. 13, and FIG. 14 show a cross section of the cam cylinder along a 12—12 line in FIG. 11. FIG. 12 shows the shape of a cam groove cut by machining a metallic cam cylinder as conventionally performed. FIG. 13 and FIG. 14 show the shapes of cam grooves cut in a cam cylinder, which is an injection mold, using a sliding die assembly as conventionally performed.

Referring to FIG. 11, the shape of a groove portion 168 equivalent to part of a cam groove is compared with the shape of a groove portion 169 equivalent to another part thereof. The groove portion 169 is separated by an angle from the groove portion 168. When the cam groove is created by machining a cylindrical member as conventionally performed, the groove portion 168 and groove portion 169 are both, as shown in FIG. 12, formed in radial directions with respect to a center axis of the cam cylinder 160. As for the sectional shape, the opposed inner walls of each of the groove portions are mutually parallel. A cam pin can therefore meet the walls of the cam groove at the same angle all over the cam groove. Moreover, the cam pin should merely be shaped cylindrically. Thus, the cam pin can be engaged with the cam groove without a problem.

By contrast, as far as an injection mold that has been generally employed in recent years is concerned, the cylindrical part of the cam cylinder 160 is molded by performing core molding. In the core molding, assembled cores are moved in the direction of the optical axis. A cam groove is usually cut using a sliding die assembly except for the cam grooves, which are arranged at intervals of a certain pitch, in a special cam that can be rotationally molded. Moreover, the special cam can be removed while being turned.

In this case, the sliding die assembly may be moved in a so-called direction of outward sliding (a direction of arrow X in FIG. 12). A radial direction of the cam cylinder 160 is parallel to the direction in which the sliding die assembly is moved. The groove portion 168 formed in this radial direction has, as shown in FIG. 13, the same shape as that in FIG. 12.

By contrast, another radial direction is not parallel to the direction of the sliding die assembly. The groove portion 169 formed in this direction has one side thereof so-called undercut. For coping with undercutting, the groove portion is reshaped into a groove portion 169a. The groove portion 169a has a sectional shape whose one side is, as shown in FIG. 13, inclined relative to the radial direction and made parallel to the direction of sliding. The sectional shape of the groove portion is quite uncertain. An injection mold is therefore normally subjected to the means described below.

As shown in FIG. 14, a groove portion 168a is shaped in consideration of the shape of a cam pin to be engaged with the groove portion. Specifically, both sides of the groove portion have a given inclination. A groove portion 168a is also shaped so that both sides thereof will have a given inclination.

In line with a cam groove having a given inclination, a cam pin is tapered as described below. FIG. 15 is an enlarged view showing a major portion of the cam groove cut in the cam cylinder shown in FIG. 11, thus illustrating cross sections along CC, DD, and EE lines. The cam groove in FIG. 15 is equivalent to the second cam groove 162 in FIG. 10.

In FIG. 15, there is shown a power varying zone cam Zu. The power varying zone cam Zu is a cam having a groove that causes a lens frame to move by a small distance that is small for an angle of rotation of a cam cylinder. An angle $\theta2$ between a cam curve F and a plane G orthogonal to the optical axis is small (the cam curve is "shallow").

Moreover, a collapsing zone cam Co is, unlike the power varying zone cam Zu, a cam having a groove that causes the lens frame to move by a large distance that is large for the angle of rotation of the cam cylinder. An angle $\theta1$ between the cam curve F and the plane G orthogonal to the optical axis is larger than the angle $\theta2$ (the cam curve is "deep").

To begin with, a cam groove cut using a sliding die assembly will be discussed. An inclination $\theta3$ of an EE section is the same between the grooves in the power varying zone and collapsing zone. The cam curve F is inclined relative to the optical axis. An actual angle of opening of a groove portion, which meets a cam pin, on a section perpendicular to the cam curve F falls into angles $\theta4$ and $\theta5$ (See CC and DD sections in FIG. 15).

The larger the angles $\theta1$ and $\theta2$ between the cam curve F and the plane perpendicular to the optical axis are, the larger the angles of opening $\theta4$ and $\theta5$ are. The angle of opening in the power varying zone cam delineated by the shallow portion of the cam curve F, $\theta4$, is smaller than the angle of opening in the collapsing zone cam delineated by the deep portion of the cam curve F, $\theta5$. Incidentally, when the cam curve F is parallel to the cam cylinder (optical axis), the angle of opening should be 0.

However, in reality, a lens frame is provided with only one cam pin to be engaged with both of the grooves in the cams. The cone angle of the cam pin cannot be set to two values matching the angles of opening of the grooves. The cone angle of the cam pin is therefore set to match a larger one of the angles of opening. In the example shown in FIG. 15, both of the grooves are shaped to have the angle of opening $\theta5$. Accordingly, the cone angle of the cam pin is set to a value equivalent to the angle of opening $\theta5$.

Consequently, the power varying zone cam whose groove can be shaped to have a smaller angle of opening in principle must be tapered at an unnecessarily large inclination. The cone angle of the cam pin is made larger accordingly. This poses problems described below.

1) As the cone angle of the cam pin gets larger, a magnitude of misfit between the cam pin and cam groove stemming from a backlash in a radial direction tends to increase. Consequently, positioning precision deteriorates.

In other words, a slight gap preserved in a radial direction between the lens frame and cam cylinder for the purpose of smoother movements gets larger proportionally to the cone angle of the cam pin. Consequently, a mismatch of the lens frame occurring in the direction of positioning increases.

The mismatch of the lens frame occurring in the direction of positioning has posed a problem in the past. For solving the problem, for example, Japanese Unexamined Patent Publication No. 62-112109 has disclosed various technological means. A zoom lens that is disclosed in the Japanese Unexamined Patent Publication No. 62-112109 has solved the problem that the mismatch of the lens frame occurs in the direction of positioning. Specifically, a substantially arc-shaped constraining spring is laid along the outer circumferences of the lenses, and a cam pin is pushed against a wall of a cam groove.

2) When the cone angle of a cam pin is large, there arises a problem that the cam pin is likely to come off a cam groove or, on the contrary, to bite into the cam groove. An extraneous force may be applied especially to a first lens frame located foremost (nearest an object) in a lens barrel. The problem is most likely to occur in the first lens frame.

Moreover, for designing a compact and lightweight lens barrel, the diameter of the lens barrel may be decreased or a length in a radial direction by which a lens frame is engaged with the lens barrel may be decreased. Otherwise, the thickness of a cam cylinder may be decreased. In this case, the foregoing problem is more likely to occur.

In the example shown in FIG. 15, the sliding die assembly is of an outward sliding type that is moved outward of a cam cylinder. Alternatively, the sliding die assembly may be of a type being moved inward. Nevertheless, the same can apply to the type of sliding die assembly. However, the direction of opening is reversed.

Next, a second problem occurring when a cam cylinder having a cam groove composed of two grooves in different cams is manufactured by performing injection molding will be described. The second problem is deterioration of precision in dimensions of a cam groove.

In the aforesaid prior art, as shown in FIG. 10, an extreme telephotographic position T1 in the first cam groove 161 and an extreme wide-angle position W2 in the second cam groove 162 are located on the outer and inner circumferences of the cam cylinder. Likewise, a stored position C1 in the first cam groove 161 and an extreme telephotographic position T3 in the third cam groove 163 are located on the outer and inner circumferences of the cam cylinder. The extreme telephotographic position T1 and extreme wide-angle position W2, and the stored position C1 and extreme telephotographic position T3 have a positional relationship that they are nearly overlapping. In the areas in which the positions are overlapping, the thickness of the cam cylinder varies locally greatly. This results in a so-called drop. The dimensions of a cam groove slightly differ because of the drop.

In general, when precision must be ensured for cam grooves, the cam grooves must be arranged in a cam cylinder in full consideration of the restrictions placed due to molding. However, as mentioned above, the power varying zone cam and collapsing zone cam are formed continuously, and grooves cut in the cams constitute one large cam groove. The layout of cam grooves in the surface of the cam cylinder is restricted by the relationship among the cam grooves causing lens frames to move. It becomes very hard to attain both the compactness of the cam cylinder and the precision in dimensions of the cam grooves.

Moreover, when the cam grooves overlap while lying on both sides of the cam cylinder, the thickness of the cam cylinder gets small in that area. If a load of a drop or any other impact were imposed on the cam cylinder, the load would be concentrated on the thin area. Consequently, the cam cylinder would be deformed.

SUMMARY OF THE INVENTION

An object of the present invention is to provide a zoom lens barrel capable of ensuring precision in dimensions for a cam groove by preventing a cam pin from coming off the cam groove or from biting into the cam groove, and capable of contributing to realization of a compact and lightweight design and minimization of the cost of manufacturing.

Briefly, according to the present invention, a zoom lens barrel is composed of a cam member having a first cam groove and second cam groove cut therein, and a lens frame having a first cam pin to be engaged with the first cam groove and a second cam pin to be engaged with the second cam groove. When the first cam pin formed on the lens frame moves along the first cam groove, the lens frame moves over a first zone in the direction of an optical axis. When the second cam pin formed on the lens frame moves along the second cam groove, the lens frame moves over a second zone in the direction of the optical axis.

These objects and the other objects of the present invention and the advantages thereof will be apparent from the description below.

According to the present invention, two cam grooves are formed in respective moving zones in a single cam member. Each cam groove and each cam pin to be engaged with the cam groove can be readily optimized.

Moreover, grooves in a power varying zone and collapsing zone that are delineated by different cam curves are separate cam grooves. The cam grooves can be optimized readily.

Moreover, a cam member is a cam cylinder. This contributes to realization of a compact and lightweight zoom lens barrel. Consequently, an apparatus such as a camera to which the zoom lens barrel is adapted can be designed compactly.

According to the present invention, there is provided a zoom lens barrel capable of ensuring precision in dimensions for a cam groove by preventing a cam pin from coming off the cam groove or from biting into the cam groove, and capable of contributing to realization of a compact and lightweight design and minimization of the cost of manufacturing.

BRIEF DESCRIPTION OF THE DRAWINGS

FIG. 2 is a longitudinal sectional view showing a major portion of the zoom lens barrel shown in FIG. 1;

DESCRIPTION OF THE PREFERRED EMBODIMENTS

Figure 1:
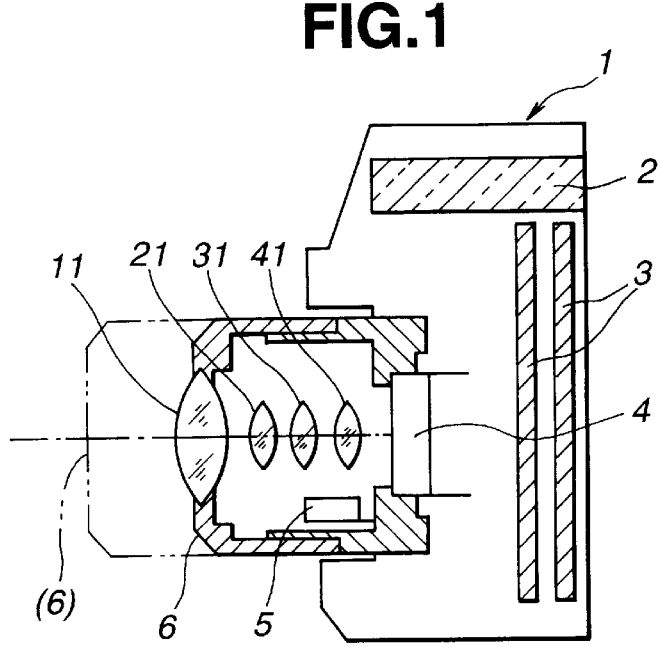
FIG. 1 is a side sectional view briefly showing in a simplified manner the structure of a camera having a zoom lens barrel of the first embodiment of the present invention incorporated therein.

FIG. 1 is a side sectional view briefly showing the structure of a camera in which a zoom lens barrel of the first embodiment of the present invention is incorporated. This embodiment will be described by taking an electronic camera as an example of a photographic apparatus having a zoom lens barrel incorporated therein.

Prior to a description of a zoom lens barrel of this embodiment, the overall structure of an electronic camera that is a photographic apparatus having the zoom lens barrel incorporated therein will be described briefly below.

The electronic camera 1 is, as shown in FIG. 1, composed of a plurality of groups of photographic lenses (11, 21, 31, and 41), a zoom lens barrel 6, an imaging device 4, an optical viewfinder 2, electric printed-circuit boards 3, and a zoom motor 5. The plurality of groups of photographic lenses constitutes a photographic optical system for forming an object image. The zoom lens barrel 6 is composed of a plurality of lens frames for holding the groups of photographic lenses. The imaging device 4 such as a CCD converts a light beam (or object light beam), which carries an object image and is transmitted by the photographic optical system, into an electric signal. The electric printed-circuit boards 3 have electric circuits for performing various kinds of control mounted thereon. The zoom motor 5 is incorporated in the zoom lens barrel and serves as a driving means for initiating movements to be made for varying the power of the photographic lenses.

The electric printed-circuit boards 3 are arranged near the back of the electronic camera 1 inside the electronic camera 1. Mounted on the printed-circuit boards 3 are an imaging unit, a memory, a reproducing unit, a camera control unit, and a system control unit. The imaging unit processes an electric signal provided by the imaging device 4. In the memory, a picture signal produced by the imaging unit is recorded. The reproducing unit reproduces a picture signal recorded to be output externally in the memory. The camera control unit controls various units for making movements for varying the power of the photographic lenses or for automatically focusing the photographic lenses. The system control unit controls the whole camera.

The photographic optical system incorporated in the zoom lens barrel 6 is composed mainly of four groups of photographic lenses. Namely, the photographic optical system consists mainly of a first group of lenses 11, a second group of lenses 21, a third group of lenses 31, and a fourth group of lenses 41 that are arranged in that order from the side of an object. In the zoom lens barrel 6, a light level adjusting means such as aperture blades or a shutter member is arranged between groups of photographic lenses, though it is not shown in FIG. 1, for simplicity.

Moreover, the photographic optical system incorporated in the zoom lens barrel 6 of this embodiment is a zoom lens whose power is variable. The cylinder 6 may be of a type collapsible in the camera body in a non-photographic state. The state shown in FIG. 1 is the non-photographic state in which the zoom lens barrel 6 is located at a stored position. A state indicated with an alternate long and two short dashes line is a photographic state of the zoom lens barrel 6.

FIG. 2 is a longitudinal sectional view showing a major portion of the zoom lens barrel of this embodiment. For avoiding complication of the drawing, only primary members having direct relation to the present invention are illustrated. In other words, illustrated are a plurality of groups of photographic lenses constituting a photographic optical system, a plurality of lens frames for holding the groups of photographic lenses separately, and a cam cylinder that is a cam member for causing the plurality of lens frames to move.

The zoom lens barrel 6 consists of a first lens frame 10, a second lens frame 20, a third lens frame 30, a fourth lens frame 40, a cam cylinder 60, a zoom motor 5 (not shown in FIG. 2. See FIG. 1), and a power transmission/reduction mechanism (not shown). Herein, the first lens frame 10 holds the first group of lenses 11. The second lens frame 20 holds the second group of lenses 21. The third lens frame 30 holds the third group of lenses 31. The fourth lens frame 40 holds the fourth group of lenses 41. The cam cylinder 60 is a cam member for causing the first to fourth lens frames 10, 20, 30, and 40 to move to given positions. The zoom motor 5 causes the cam cylinder 60.

The first lens frame 10 is realized with a thin cylindrical member, and has an opening, in which the first group of lenses is fitted, substantially in the center thereof. The first lens frame 10 has a lens holding portion 10c as end thereof. The left-hand ends of two guide shafts 110 (only one guide shaft is shown in FIG. 2) are each embedded in the lens holding portion 10c. The guide shafts 110 extend in parallel with an optical axis O towards the back end of the cylinder 6. The other (right-hand) ends of the guide shafts 110 (only one is shown in FIG. 2) are each slidably fitted into a fitting portion 51 of a locking frame 50 placed as a back end of the lens barrel 6. The first lens frame 10 is thus able to slide freely in the direction of the optical axis in the lens barrel 6.

The second lens frame 20 holds the second group of lenses 21, which is composed of three optical lenses, substantially in the center thereof. A supporting portion 20c having two fitting holes 23 (only one is shown in FIG. 2) bored therein is formed on the outer circumference of the second lens frame 20. The supporting portion 20c is facing outward in parallel with the optical axis O. The left-hand ends of two guide shafts 111 (only one of them is shown in FIG. 2) are, like those of the guide shafts 110, slidably fitted into the fitting holes 23. The other ends of the guide shafts 111 are embedded in the locking frame 50. The second lens frame 20 is, like the first lens frame 10, able to slide freely in the direction of the optical axis. Concurrently, a turn of the second lens frame 20 about an axis orthogonal to the optical axis is restricted.

The third lens frame 30 holds the third group of lenses 31, which is composed of three optical lenses, substantially in the center thereof. The two guide shafts 111 are fitted into two fitting holes 33 (only one is shown) bored in a supporting portion 30b of the third lens frame 30 formed similarly to those in the second lens frame 20. The third lens frame 30 is, like the first and second lens frames 10 and 20, thus able to slide freely only in the direction of the optical axis.

The fourth lens frame 40 holds the fourth group of lenses 41. The two guide shafts 111 are fitted into two fitting holes 43 (only one is shown) bored in a supporting portion 40b of the fourth lens frame 40 formed similarly to those in the second and third lens frames 20 and 30. The fourth lens frame 40 is, like the first, second, and third lens frames 10, 20, and 30, able to slide freely only in the direction of the optical axis.

In this embodiment, when the cam cylinder 60 that is a cam member is moved (i.e., rotated) for varying the power of the photographic lenses or for causing the zoom lens cylinder to collapse, the first to fourth lens frames 10, 20, 30, and 40 are moved to given positions. Now, the cam cylinder 60 will be described. The cam member in this embodiment is the cylindrical cam cylinder 60. Alternatively, a plate-like cam member may be adopted.

The cam cylinder 60 is realized with a cylindrical cam shaped like a cylinder whose opposite ends are both open. The first lens frame 10 is engaged with the outer circumference of the cam cylinder 60. The second lens frame 20, third lens frame 30, and fourth lens frame 40 are successively engaged with the inside of the cam cylinder 60. The four guide shafts 110 and 111 are passed through the cam cylinder 60. The extreme back ends of the shafts 110 and 111 extend into fittings 51 in the locking frame 50, so that the shafts 110 and 111 will extend parallel to the optical axis O and perpendicularly to the face of the camera.

When the lens barrel 6 is located at the stored position in the non-photographic mode, the distal part of the cam cylinder 60 abuts on the inner wall of the lens supporting portion 10c of the first lens frame 10.

Moreover, a gear 65 (See FIG. 3) that is a transmitting means for transmitting a driving force exerted by the zoom motor 5 to the cam cylinder 60 so as to turn the cam cylinder is formed on the inner circumference of the cam cylinder 60.

Furthermore, two cam grooves of a first cam groove 60a and second cam groove 60b are formed in the outer circumference of the cam cylinder 60. Two cam pins, that is, a first cam pin 10a and second cam pin 10b are planted in the inner circumference of the first lens frame 10 with the pins facing inward. The first cam pin 10a and second cam pin 10b slidably engaged the first cam groove 60a and second cam groove 60b respectively.

Moreover, two cam grooves of a first cam groove 60c and second cam groove 60d associated with the second lens frame 20 are formed in the inner circumference of the cam cylinder 60. Besides, a third cam groove 60e associated with the third lens frame 30 and a fourth cam groove 60f associated with the fourth lens frame 40 are formed in the inner circumference of the cam cylinder 60. Two cam pins, that is, a first cam pin 20a and second cam pin 20b are planted in the outer circumference of the second lens frame 20 with the pins facing outward. The first cam pin 20a and second cam pin 20b slidably engage the first cam groove 60c and second cam groove 60d respectively. A third cam pin 30a planted in the same manner slidably engages the third cam groove 60e. A fourth cam pin 40a planted in the same manner slidably engages the fourth cam groove 60f.

An infrared (IR) cut filter 9, a low-pass filter (LPF) 8, and the imaging device 4 are arranged in that order moving from the side of an object and thus are locked in the locking frame 50. The IR cut filter 9 removes an infrared component from an object light beam transmitted by the imaging optical system. The low-pass filter 8 removes a high-frequency component from the object light beam transmitted by the IR cut filter 9.

The zoom motor 5 and power transmission/reduction mechanism are locked in the locking frame 50. An output gear of the power transmission/reduction mechanism is meshed with the gear 65 on the cam cylinder 60. A driving force exerted by the motor 5 is thus transmitted to the cam cylinder 60 via the power transmission/reduction mechanism and gear 65. The cam cylinder 60 is thus turned.

Figure 9A:
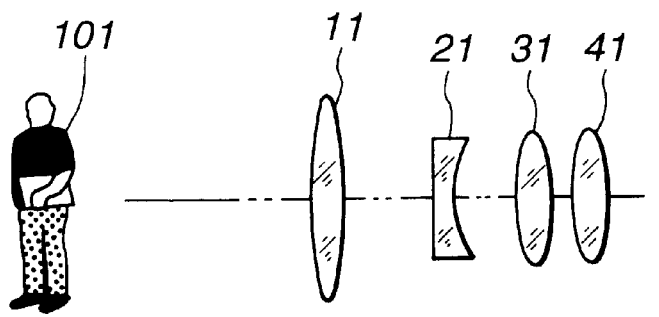
FIG. 9A is a diagram showing approximate locations of groups of photographic lenses in a conventional zoom lens barrel that is brought to a collapsed state.
Figure 9B:
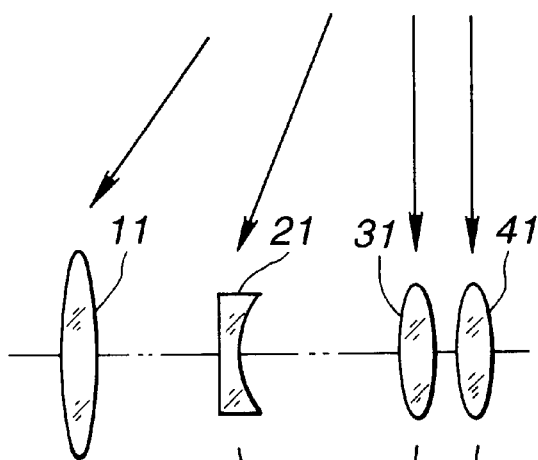
FIG. 9B is a diagram showing approximate locations of the groups of photographic lenses that are short-focus (or wide-angle) positions in a photographic state.
Figure 9C:
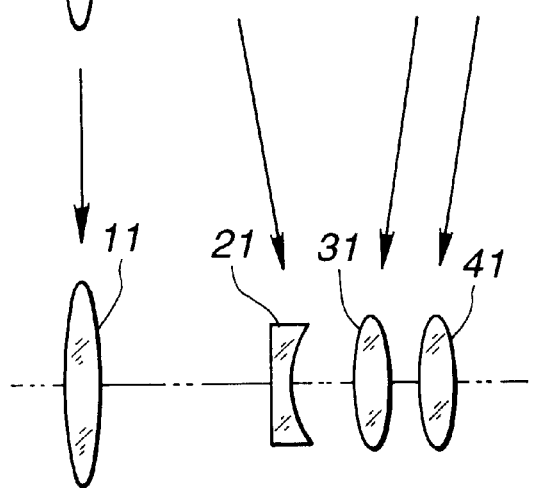
FIG. 9C is a diagram showing approximate locations of the groups of photographic lenses that are long-focus (or telephotographic) positions in the photographic state.
Figure 11:
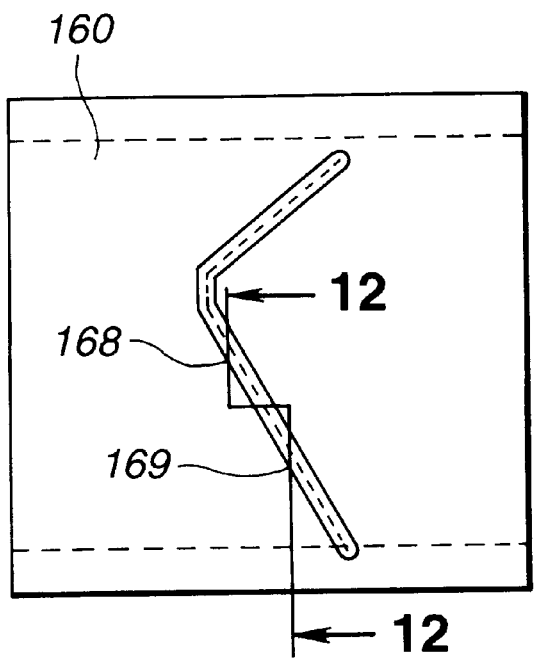
FIG. 11 is a side view showing a typically shaped cam cylinder included in a conventional zoom lens barrel.
Figure 12:
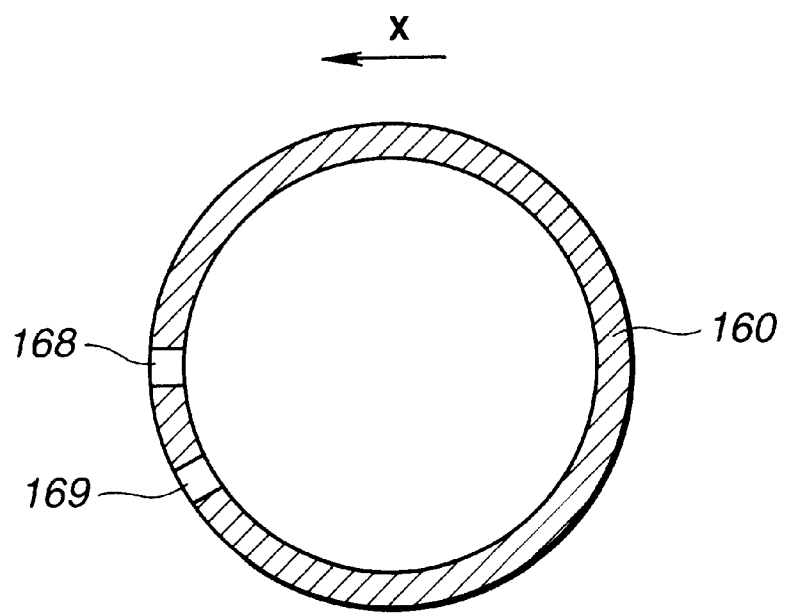
FIG. 12 is a sectional view showing a section of the cam cylinder along the 12—12 line shown in FIG. 11, thus illustrating the shapes of cam grooves cut by machining a conventional metallic cam cylinder.
Figure 13:
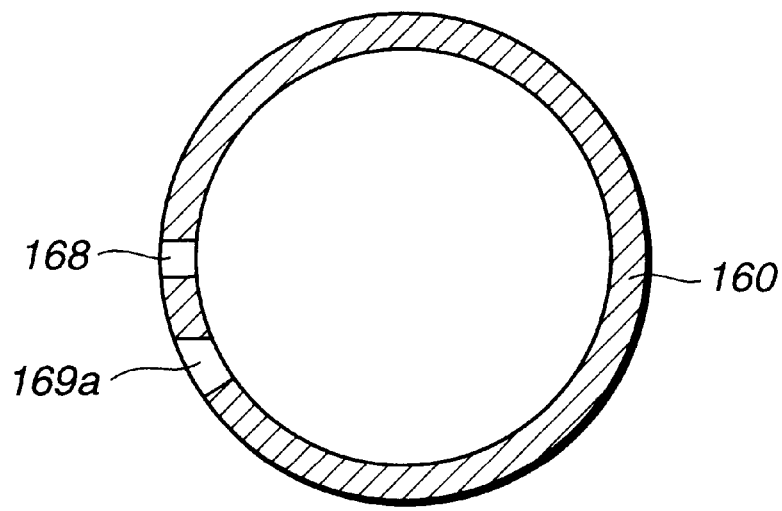
FIG. 13 is a sectional view showing the section of the cam cylinder along the 12—12 line shown in FIG. 11, thus illustrating the shapes of cam grooves cut in a conventional cam cylinder that is an injection mold using a sliding die assembly.
Figure 14:
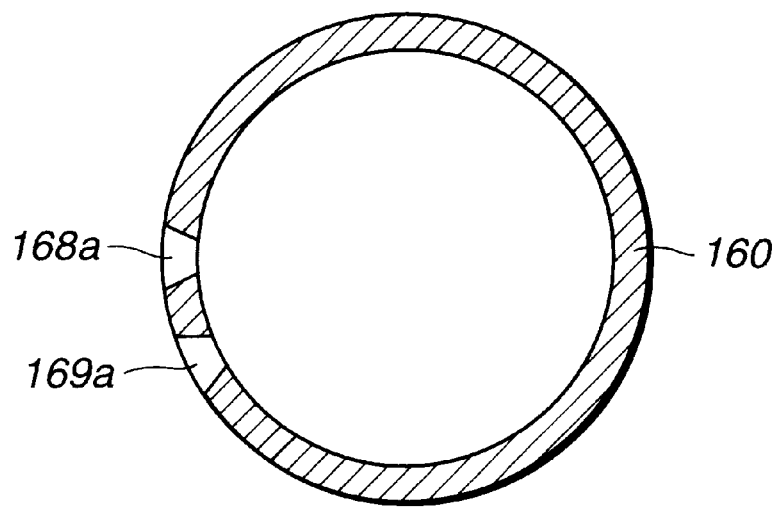
FIG. 14 is a sectional view showing the section of the cam cylinder along the 12—12 line shown in FIG. 11, thus illustrating the shapes of cam grooves cut in a conventional cam cylinder that is an injection mold using a sliding die assembly.
Figure 15:
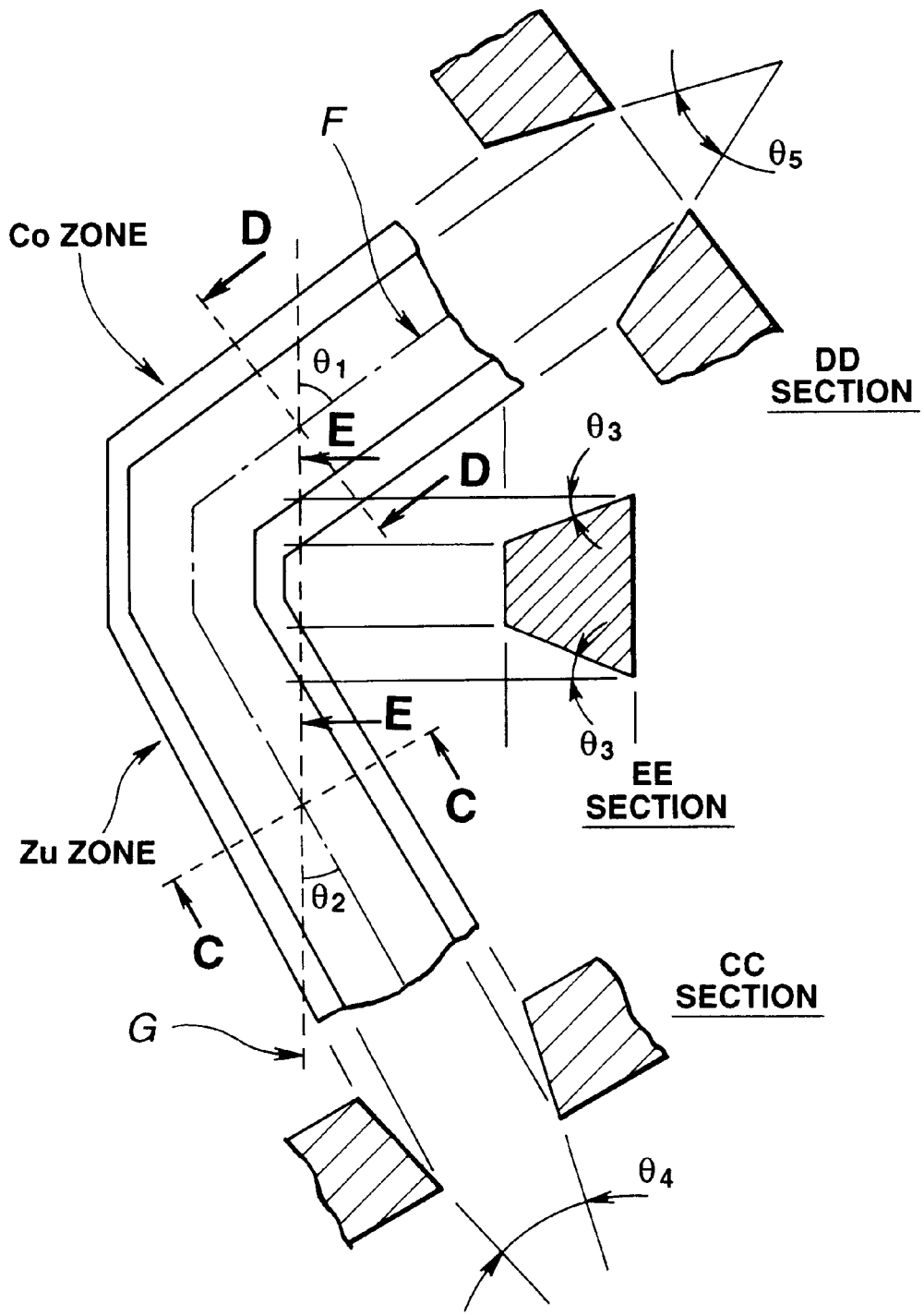
FIG. 15 is a diagram showing in enlargement a major portion of the cam groove in the cam cylinder shown in FIG. 11, thus illustrating cross sections of the cam groove along the CC, DD, and EE lines.

Next, the actions of the electronic camera 1 will be briefly described below. The given positions of the groups of photographic lenses in the respective states (collapsed state and photographic state) of the camera are identical to those described in conjunction with FIG. 9A, FIG. 9B, and FIG. 9C.

To begin with, the main power supply of the electronic camera 1 is turned on by a photographer. The system control unit on the electric printed-circuit boards 3 carries out various operations for activating the camera. The zoom motor 5 rotates in response to an instruction sent from the camera control unit. This causes the groups of photographic lenses to move to wide-angle positions that are ready-to-photograph positions (starting with a position indicated with an alternate long and two short dashes line in FIG. 1) (See FIG. 9B) via the cam cylinder of the zoom lens barrel 6.

At this time, the first lens frame 10 juts forward (towards an object). The first lens frame 10 thus moves from a stored position (collapsed position) indicated with a solid line in FIG. 1 to the ready-to-photograph position (wide-angle position) indicated with the alternate long and two short dashes line. At the same time, the second group of lenses 21 moves to the given position nearer to the object. The third group of lenses 31 and fourth group of lenses 41 do not move.

When the first lens frame 10 is located at the ready-to-photograph position (wide-angle position), the photographer may perform manipulations for varying the power of the photographic lenses. The zoom motor 5 is then driven, whereby any movements are made for varying the power. When movements are made for varying the power in a photographic mode, the second group of lenses 21, third group of lenses 31, and fourth group of lenses 41 (excluding) the first group of lenses 11) are moved to the given positions (See FIG. 9C).

The photographer may perform manipulations for releasing the shutter member. An AF drive motor (not shown) is then driven, whereby the fourth group of lenses 41 is moved to a given in-focus position. Thereafter, an image projected on the imaging device 4 is recorded in the form of an electric signal.

For terminating photography, the photographer turns off the main power supply. The system control unit carries out a given operation for terminating photography. Thereafter, the zoom motor 5 is driven, and the cam cylinder 60 is turned. This causes the photographic optical system to move to the stored position (See FIG. 9A).

Figure 3:
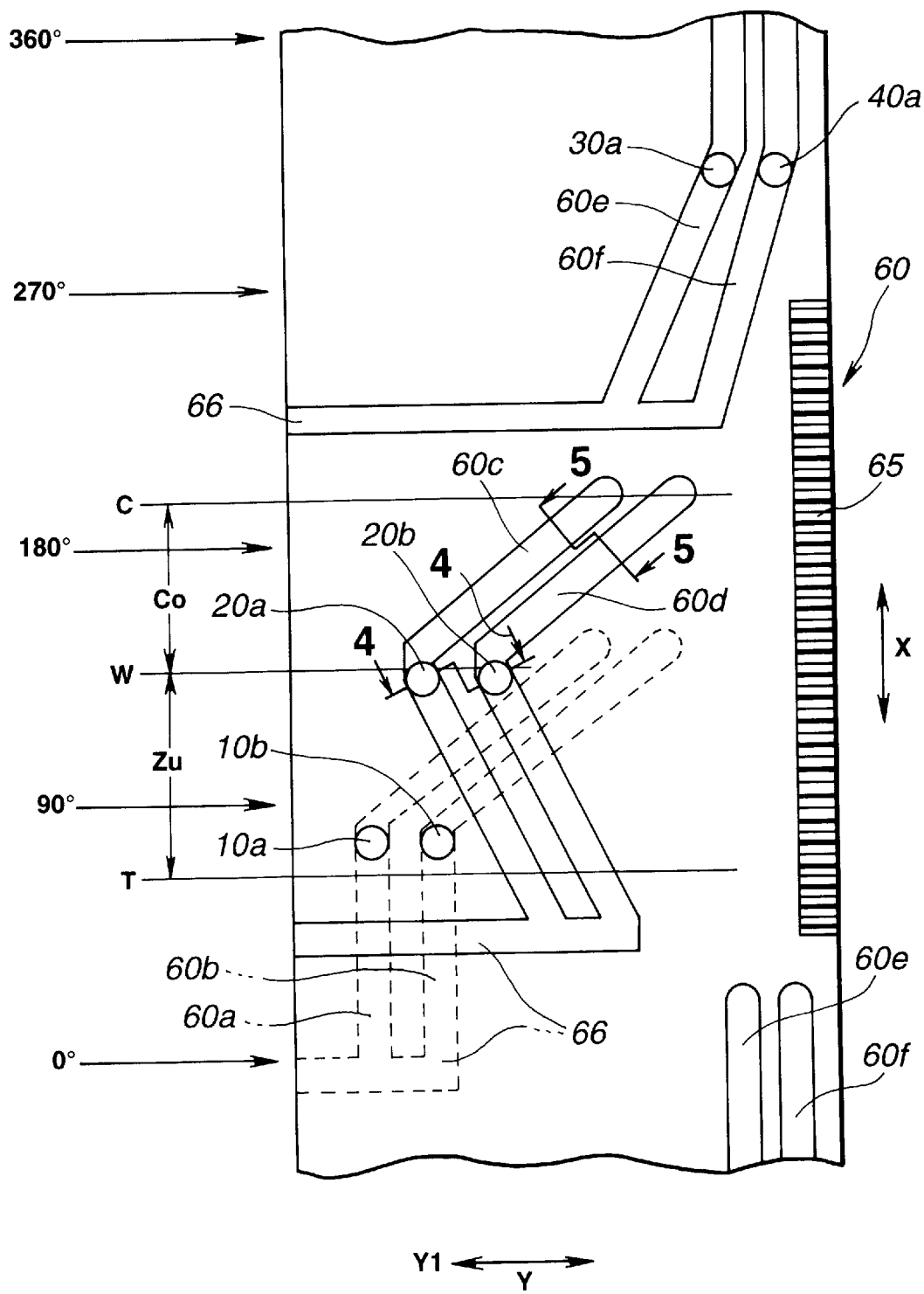
FIG. 3 is a diagram showing the development of a cam cylinder of the zoom lens barrel shown in FIG. 1.

FIG. 3 is a diagram showing the development of the cam cylinder of the zoom lens barrel of this embodiment, thus illustrating the cam grooves. FIG. 3 shows the inner circumference of the cam cylinder 60. Directions of arrows X in FIG. 3 are directions in which the cam cylinder 60 is turned. In FIG. 3, 0°, 90°, 180°, 270°, and 360° mean angles of rotation of the cam cylinder 60. Directions of arrows Y are directions in which the lens frames are moved (direction of the optical axis). A direction of arrow Y1 is a direction towards an object. Moreover, the cam pins in FIG. 3 are placed in the ready-to-photograph state (wide-angle positions).

The first cam groove (indicated with a dashed line) causing the first lens frame 10 to move is cut in a concave form in the outer circumference of the cam cylinder 60. The first cam groove is delineated with cam curves continuously lying in a power varying zone that is a first zone and a collapsing zone that is a second zone. The first cam groove is composed of the first cam groove 60a and second cam groove 60b. The first and second cam grooves are juxtaposed in the direction of the optical axis with a certain distance between them. The first and second cam grooves are delineated with the mutually identical cam curves. The first cam pin 10a and second cam pin 10b of the first lens frame 10 are engaged with the first and second cam grooves 60a and 60b.

Moreover, a second cam groove (indicated with a solid line) causing the second lens frame 20 to move is cut in a concave form in the inner circumference of the can cylinder 60. The second cam groove is delineated with cam curves continuously lying in a power varying zone Zu and collapsing zone Co. The second cam groove is composed of a first cam groove 60c and second cam groove 60d. The first and second cam grooves 60c and 60d are juxtaposed in the direction of the optical axis with a certain distance between them and delineated with the mutually identical cam curves. The first cam pin 20a and second cam pin 20b of the second lens frame 20 slidably engage the first and second cam grooves 60c and 60d. The cam curve in the power varying zone Zu is shallower than the cam curve in the collapsing zone Co. The power varying zone Zu is formed with a cam causing the second lens frame to move by a length that is smaller for an angle of rotation. The collapsing zone that should cause the second lens frame to move to the stored position. By contrast, the cam of the power varying zone offers a large angle of rotation because positioning in the middle of the zone must be achieved with precision.

The cam grooves causing the third lens frame 30 and fourth lens frame 40 to move (indicated with a solid line) are cut in a concave form in the inner circumference of the cam cylinder 60. The cam grooves are the third cam groove 60e and fourth cam groove 60f delineated with different cam curves. The cam pin 30a of the third lens frame 30 and the cam pin 40a of the fourth lens frame 40 slidably engage the third and fourth cam grooves.

In the vicinity of the telephotographic position in each cam groove, an introducing portion 66 that is a groove parallel to the optical axis is formed. The introducing portion 66 fills the role of an inlet assisting in engaging the cam pins with the cam cylinder 60 when constructing and assembling the zoom lens barrel 6.

The plurality of cam pins in this embodiment, that is, the first cam pin 10a and second cam pin 10b, and the first cam pin 20a and second cam pin 20b are formed so that a line passing through their centers is parallel to the optical axis. Accordingly, the introducing portions 66 are formed in a direction parallel to the optical axis. Alternatively, for example, when the plurality of cam pins is located at different positions, the introducing portions may be formed according to the layout of the cam pins.

Moreover, in this embodiment, the introducing portions 66 are located at the end of the cam grooves near the telephotographic positions. Alternatively, for example, they may be provided near the stored positions or in the middles of the cam grooves.

Herein, the plurality of cam grooves will be detailed below by taking the second cam groove (first cam groove 60c and second cam groove 60d), which cause the second lens frame 20 to move, for instance.

The second lens frame 20 is provided with two cam pins associated with the two cam grooves, that is, the first cam pin 20a and second cam pin 20b (See FIG. 2). The cam pins 20a and 20b are juxtaposed so that a line passing through their centers is parallel to the optical axis of the zoom lens barrel 6.

As mentioned above, FIG. 3 shows the locations of the cam pins when the zoom lens barrel 6 is placed in the ready-to-photograph state, that is, located at the extreme wide-angle position. In FIG. 3, therefore, a position W is the extreme wide-angle position. A position T is the extreme telephotographic position, and a position C is the stored (collapsed) position. A zone between the position C and position W is the collapsing zone Co. A zone between the position W and position T is the power varying zone Zu.

Figure 4:
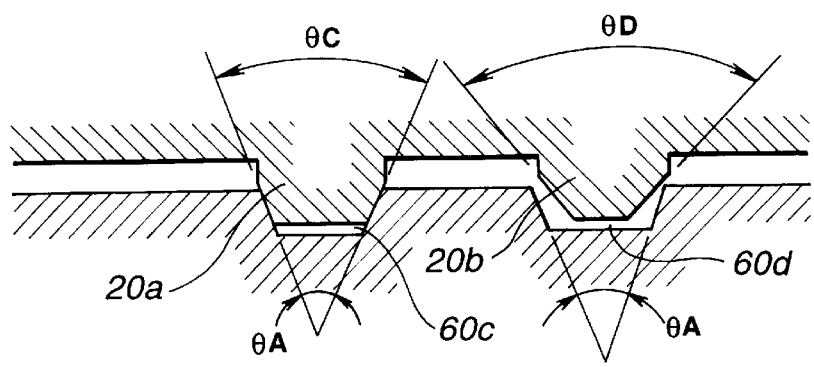
FIG. 4 is a longitudinal sectional view showing in enlarged fashion a major portion of the cam cylinder shown in FIG. 3 on a plane perpendicular to cam curves delineating a first cam groove and second cam groove, thus illustrating a section of the major portion along the 4—4 line shown in FIG. 3.
Figure 5:
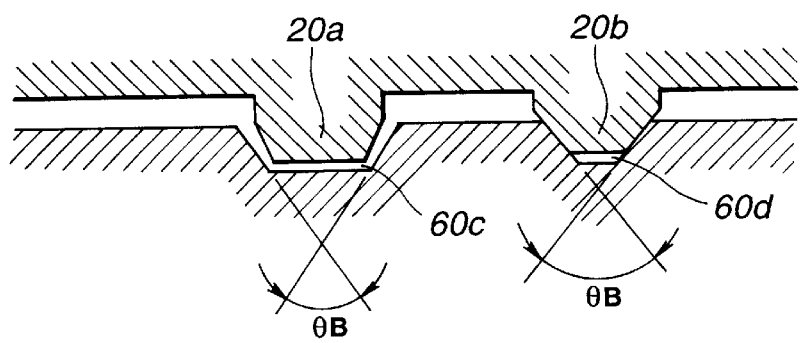
FIG. 5 is a longitudinal sectional view showing in enlarged fashion the major portion of the cam cylinder shown in FIG. 3 on the plane perpendicular to the cam curves delineating the first cam groove and second cam groove, thus illustrating a section of the major portion along the 5—5 line shown in FIG. 3.

FIG. 4 and FIG. 5 are longitudinal sectional views showing in enlargement a major portion on a plane perpendicular to the cam curves delineating the first cam groove 60c and second cam groove 60d. FIG. 4 shows the first cam groove 60c and second cam groove 60d in the power varying zone Zu, thus illustrating a section along the 4—4 line in FIG. 3. FIG. 5 shows the first cam groove 60c and second cam groove 60d in the collapsing zone Co, thus illustrating a section along the 5—5 line in FIG. 3.

As shown in FIG. 3, the first cam groove 60c and second cam groove 60d are each formed by continuously cutting grooves in the collapsing zone Co and power varying zone zu. The grooves in the collapsing zone Co and power varying zone Zu are undercut because of the employment of a sliding die assembly, and therefore only necessary portions thereof have given angles of opening. Different angles of opening are set for the grooves in the collapsing zone Co and power varying zone Zu respectively.

Specifically, in the power varying zone Zu, the first cam groove 60c and second cam groove 60d are, as shown in FIG. 4, set to a common angle of opening θA. Likewise, in the collapsing zone Co, the first cam groove 60c and second cam groove 60d are, as shown in FIG. 5, set to a common angle of opening θB. Herein, the angle of opening θA and angle of opening θB are set to different values.

In other words, the cam curve delineating the cam grooves 60c and 60d in the power varying zone Zu is shallower than that in the collapsing zone Co. For the aforesaid reasons, the angle of opening θA in the power varying zone Zu is set to be smaller than the angle of opening θB in the collapsing zone Co (θA<θB).

The cone angle θC of the first cam pin 20a is set to a value matching the angle of opening θA. The cone angle θD of the second cam pin 20b is set to a value matching the angle of opening θB.

The first and second cam pins 20c and 20d of the second lens frame 20 are engaged with the thus formed first and second can grooves 60c and 60d in the cam cylinder 60. In the power varying zone Zu, the first cam pin 20a is, as shown in FIG. 4, engaged with the first cam groove 60c substantially without a gap. The second cam groove 60d is shaped to have a backlash relative to the second cam pin 20b. The pin 20b will therefore not meet (i.e. engage) the diagonal inner walls of the groove 60d.

Moreover, in the collapsing zone Co, the second cam pin 20b is engaged with the second cam groove 60d substantially without a gap. The first cam groove 60c is shaped to have a backlash relative to the second cam pin 20a. The sliding surface of the pin 20a will therefore not meet the inner walls of the groove 60c.

The relationships between the first and second cam grooves 60a and 60b of the first lens frame 10 and the first and second cam pins 10a and 10b of the cam cylinder 60 are identical to those of the cam pins of the second lens frame 20 and the cam grooves in the cam cylinder 60.

On the other hand, the third lens frame 30 is, as shown in FIG. 3, provided with only one cam groove of the third cam groove 63. The cam curve delineating the third cam groove 63 in the collapsing zone Co is parallel to a direction in which the cam cylinder 60 makes a turn. The cam curve in the power varying zone Zu is so shallow that an angle between the cam curve and a plane orthogonal to the optical axis is small. As far as the third cam groove 63 is concerned, the cam curve does not differ greatly between the collapsing zone Co and power varying zone Zu. The third cam groove 63 is formed uniformly with the angle of opening matched with the power varying zone Zu. Moreover, the fourth cam groove 64 in the fourth lens frame 40 is formed similarly to the third cam groove 63 in the third lens frame 30.

Movements to be made by the thus structured zoom lens barrel 6 of this embodiment will be briefly described below.

When the main power supply of the camera is turned on, the cam cylinder 60 is turned. This causes the lens frames that are brought to the collapsed state (stored positions) to move autonomously to the extreme wide-angle positions so as to enter the ready-to-photograph state. At this time, the first lens frame 10 moves towards an object owing to the second cam pin 10b engaged or borne with or by the second cam groove 60b in the cam cylinder 60. Moreover, the first cam pin 10a is not engaged with the first cam groove 60a but passes through the first cam groove 60a.

On the other hand, the second lens frame 20 moves towards the object owing to the second cam pin 20b engaged or borne with or by the second cam groove 60c in the cam cylinder 60. The first cam pin 20a is not engaged with the first cam groove 60c but passes through the first cam groove 60c with a given clearance.

Moreover, the third lens frame 30 moves while being guided along the third cam groove 63 by the third cam pin 30a. The fourth lens frame 40 moves while being guided along the fourth cam groove 64 by the fourth cam pin 40a. At this time, the lens frames 30 and 40 do not move in the direction of the optical axis. This is because the third and fourth cam grooves 63 and 64 are delineated to be parallel to a direction in which the cam cylinder makes a turn. Eventually, the camera enters the ready-to-photograph mode.

Next, when the camera lies in the photographic mode, a photographer performs given manipulations for varying the power of the photographic lenses. The cam cylinder 60 is turned accordingly. The first cam pin 10a of the first lens frame 10 is engaged or borne with or by the first cam groove 60a. The first cam groove 60a is delineated to be parallel to the direction in which the cam cylinder 60 makes a turn. The lens frame 10 does therefore not move in the direction of the optical axis. Moreover, the second cam pin 10b merely passes through the second cam groove 60a with a given clearance.

On the other hand, the second lens frame 20 moves within the power varying zone Zu between the extreme wide-angle position W in FIG. 3 and the extreme telephotographic position T in FIG. 3 owing to the first cam pin 20a engaged or borne with or by the first cam groove 60c. At this time, the second cam pin 20b merely passes through the second cam groove 60d.

Furthermore, the third lens frame 30 and fourth lens frame 40 move along the third and fourth cam grooves 63 and 64 in the cam cylinder 60.

Moreover, for terminating photography, the main power supply is turned off. The lens frames are then moved to the extreme wide-angle positions (W in FIG. 3) due to the turning direction of the cam cylinder 60. Thereafter, the lens frames are automatically moved to the stored positions (C in FIG. 3).

Incidentally, the second cam groove 60b and second cam pin 10b are designed so that the backlash between them will diminish. When a large extraneous force is applied to the first lens frame 10, as the first cam pin 10a meets the first cam groove 60a, so the second cam pin 10b may meet the second cam groove 60b. This realizes another stopper. Thus, the first lens frame 10 can be locked more reliably than when it is locked by utilizing one pair of cam pins and cam grooves.

Specifically, since the first lens frame 10 is located on the front side of the zoom lens barrel, when movements are made for varying the power, the first lens frame 10 juts outward on the front side thereof. An extraneous force is likely to be applied directly to the lens frame 10. In this embodiment, the lens frame 10 is supported by a plurality of cam pins. Even if the plurality of cam pins is not parallel pins but tapered pins, the cam pins will neither come off the cam grooves nor bite into the cam grooves.

Figure 6:
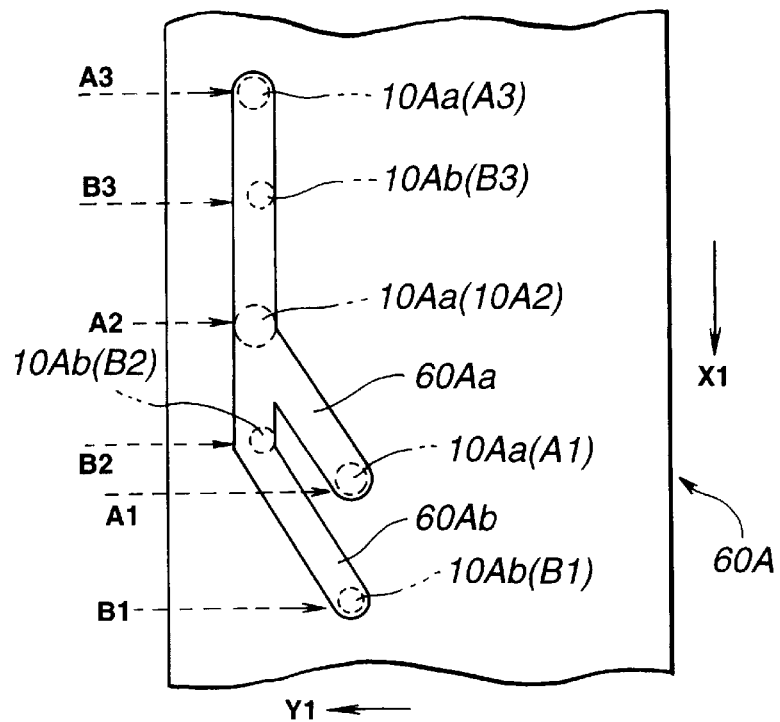
FIG. 6 is a diagram showing the development of a cam cylinder in accordance with a variant of the zoom lens barrel of the first embodiment of the present invention, thus illustrating a first cam groove causing a first lens frame to move.
Figure 7:
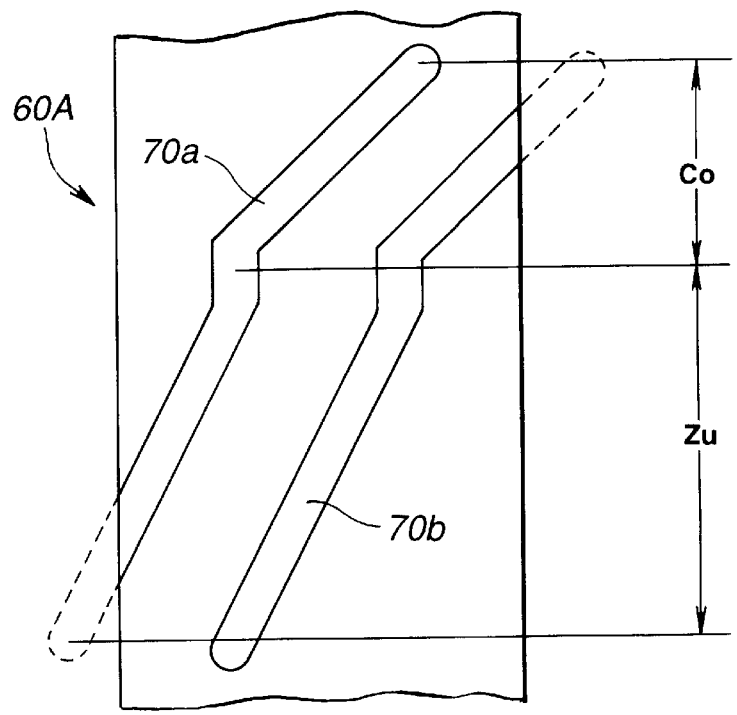
FIG. 7 is a diagram showing the development of the cam cylinder of the variant shown in FIG. 6, thus illustrating a second cam groove causing a second lens frame to move.

The shape of the cam grooves in the cam cylinder is not limited to the one adopted for the first embodiment. Any other shape is conceivable. For example, FIG. 6 and FIG. 7 are diagrams showing variants of the cam grooves to be formed in the cam cylinder. FIG. 6 is a diagram showing the development of a cam cylinder, thus illustrating a variant of the first cam groove causing the first lens frame to move (equivalent to the first cam groove 60a and second cam groove 60b). FIG. 7 is a diagram showing the development of the cam cylinder, thus illustrating a variant of the second cam groove (first cam groove 60c and second cam groove 60d) causing the second lens frame to move. FIG. 6 shows the cam cylinder seen from the outer circumferential side thereof, while FIG. 7 shows the cam cylinder seen from the inner circumferential side thereof.

Referring to FIG. 6 and FIG. 7, a variant of the zoom lens barrel of the first embodiment will be described below. The basic structure is substantially identical to that of the first embodiment. For components that are not illustrated, refer to FIG. 1 to FIG. 5.

A first cam groove is cut in a cam cylinder 60A that is a cam member causing a first lens frame (10) to move. One portion of the first cam groove lies in the power varying zone Zu that is a cam parallel to the direction in which the cam cylinder makes a turn. This portion thereof is realized with one cam groove 61. The other portion thereof lies in the collapsing zone Co, and is composed of two cam grooves of a first cam groove 60Aa and second cam groove 60Ab. The two cam grooves are inclined in the same direction relative to the cam groove 61 and parallel to each other.

Specifically, the power varying zone Co having the cam groove 61 is formed with a parallel cam (i.e., a cam orthogonal to the optical axis). The angle of opening of the cam groove 61 is therefore set to 0°. The cam groove 61 has a width that is large enough for a first cam pin 10a, which will be described later, to be able to pass through the cam groove 61 without a touch.

On the other hand, the first cam groove 61Aa and second cam groove 61Ab in the collapsing zone Co have the angle of opening thereof set to a given value according to the conditions of a cam curve and sliding die assembly.

Two cam pins, that is, a first cam pin 10Aa and second cam pin 10Ab are planted in the outer circumference of the first lens frame (10) with a certain separation angle between them. An engaging portion of the first cam pin 10Aa is realized with a bar-like member whose diameter is smaller than the width of the cam groove 60Aa. The first cam pin 10Aa is engaged with the cam groove 61.

An engaging portion of the second cam pin 10Ab is tapered according to the angle of opening of the cam groove 61 and shaped to have a size smaller than the size of cam groove 61. Like the first cam pin 10Aa, the second cam pin 10Ab is engaged with the cam groove 61.

Movements to be made by the thus structured zoom lens barrel (cam cylinder 60A and first lens frame (10)) of the variant will be briefed below. The basic movements are identical to those of the first embodiment.

To begin with, when the zoom lens barrel is placed in the collapsed state and located at the stored position, the first cam pin 10Aa and second cam pin 10Ab are located at positions A1 and B1 shown in FIG. 6. In this state, when the cam cylinder 60A turns, the cam cylinder 60A moves in a direction of arrow X1 in FIG. 6. This causes the first lens frame (10) to move towards an object (direction of arrow Y1) along the cam groove 61Ab owing to the second cam pin 10Ab. The first lens frame (10) thus moves to the extreme wide-angle position so as to enter the ready-to-photograph state. At this time, the first and second cam pins 10Aa and 10Ab are located at positions A2 and B2.

When the zoom lens barrel is making movements to collapse, the first cam pin 10Aa merely passes through the cam groove 61. This is because the engaging portion of the first cam pin 10Aa is shaped like a bar whose diameter is smaller than the width of the cam groove 60Aa. Consequently, the first cam pin 10Aa has nothing to do with the movement of the first lens frame (10).

When the zoom lens barrel is in the photographic state, movements are made to vary the power. Namely, the first lens frame (10) moves along the cam groove 61 owing to the first cam pin 10Aa. However, the cam groove 61 is included in a parallel cam. The first lens frame (10) will therefore not move in the direction of the optical axis. In other words, the position of the first cam pin 10Aa shifts between the position A2 in FIG. 6 and the position A3.

The second cam pin 10Ab merely passes through the cam groove 61 because the diameter of the engaging portion thereof is smaller than the width of the cam groove 61. The second cam pin 10Ab has nothing to do with the movement of the first lens frame (10).

On the other hand, first and second cam grooves 70a and 70b cause a second lens frame (20) to move. The first and second cam grooves 70a and 70b are, as shown in FIG. 7, cam grooves formed uninterruptedly over the collapsing zone Co and power varying zone Zu. The cam grooves 70a and 70b are arranged parallel to the direction of the optical axis and delineated by the mutually identical cam curves. The cam curves delineating the cam grooves 70a and 70b in the collapsing zone and power varying zone are inclined in the same direction relative to the direction in which the cam cylinder 60 makes a turn.

The major roles of the two cam grooves (first and second cam grooves 70a and 70b) are identical to those in the first embodiment. The first cam groove 70a causes the second lens frame to move over the collapsing zone, while the second cam groove 70b causes it to move over the power varying zone.

The dimension of the cam cylinder 60A in the direction of the optical axis (length) is determined so that the distal parts of the two cam grooves 70a and 70b will be broken away. In other words, the first cam groove 70a has the distal part thereof, which includes the extreme telephotographic position thereof in the power varying zone Zu, omitted (part drawn with a dashed line in FIG. 7). The first cam pin (20a) merely passes through the distal part of the first cam groove 70a. Moreover, the second cam groove 70b has the distal part thereof, which includes the stored position thereof in the collapsing zone Co, omitted (part drawn with a dashed line in FIG. 7). The second cam pin 10b merely passes through the distal part of the second cam groove 70b.

The reason why part of each cam groove is omitted but not formed is that the omitted part has nothing to do with the movement of the lens frame. specifically, when movements are made for allowing the zoom lens barrel to collapse or for varying the power of the photographic lenses, each cam pin merely passes through the part. The cam pin is not engaged with the part of the cam groove.

The cam cylinder 60A and lens frames are formed as mentioned above. Parts of cam grooves not involved directly in movements in the direction of the optical axis are omitted. Consequently, the dimension of the cam cylinder 60A in the direction of the optical axis (the length of the cylinder) can be designed to be shorter.

Figure 8:
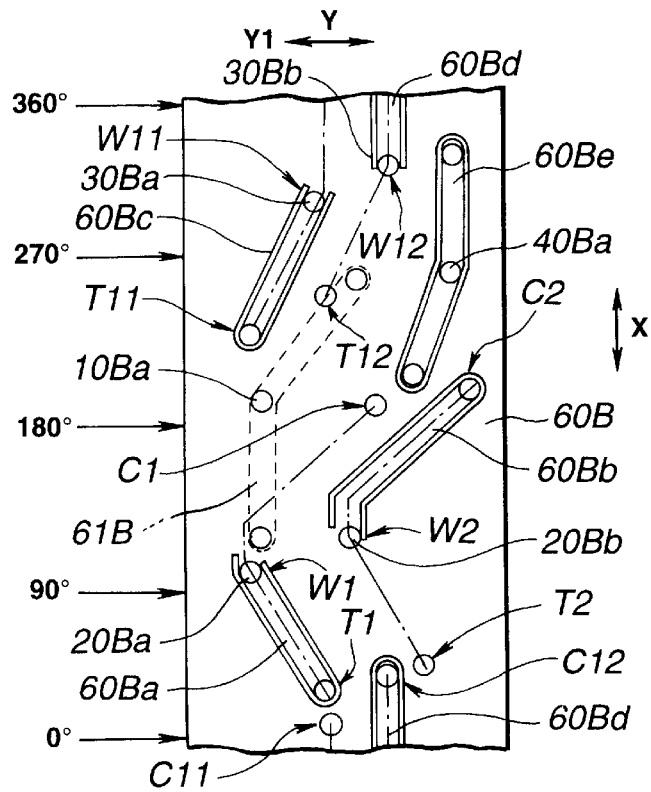
FIG. 8 is a diagram showing the development of a cam cylinder included in a zoom lens barrel of the second embodiment of the present invention.
Figure 10:
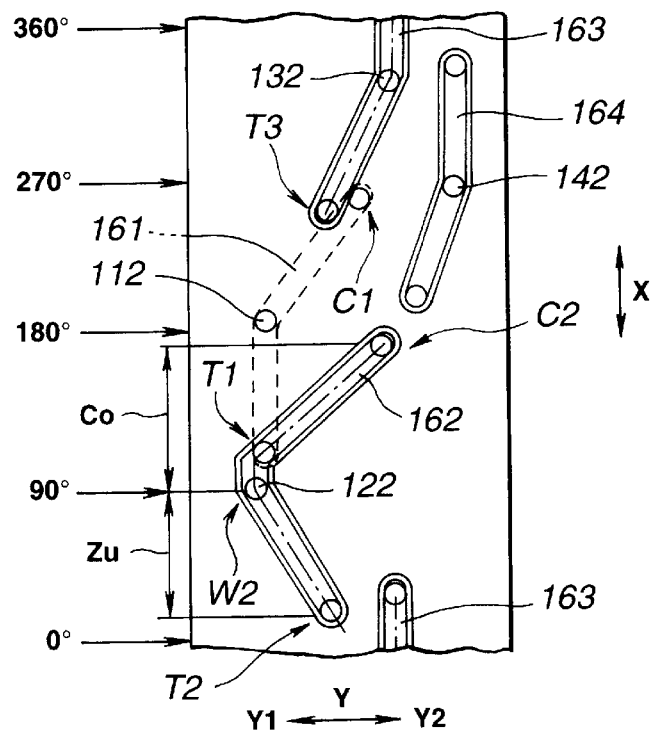
FIG. 10 is a diagram showing the development of a cam cylinder included in a conventional collapsible zoom lens barrel.

FIG. 8 is a diagram showing the development of a cam cylinder included in a zoom lens barrel of the second embodiment of the present invention. A plurality of cam grooves formed in the circumference of the cam cylinder is illustrated in FIG. 8. The basic structure of the second embodiment is substantially identical to that of the first embodiment. only a difference lies in the shape of the plurality of cam grooves and the layout of cam pins to be engaged with the cam grooves. The description of components identical to those of the first embodiment will be omitted. The difference alone will be described principally. FIG. 8 shows the plurality of cam grooves seen from the inner circumferential side of the cam cylinder 60B that is a cam member. Moreover, 0°, 90°, 180°, 270°, and 360° in FIG. 8 mean, like those in FIG. 3 and FIG. 10, angles of rotation of the cam cylinder.

A cam cylinder 60B that is a cam member of this embodiment selectively turns in the directions of arrows X in FIG. 8. The lens frames (not shown) are moved in the direction of the optical axis (directions of arrows Y). A direction of arrow Y1 is a direction towards an object.

The movements of the lens frames, which hold the plurality of groups of lenses, in the direction of the optical axis are identical to those in the first embodiment. Specifically, the first lens frame (10) moves over a collapsing zone alone but does not move over a power varying zone. Moreover, the second lens frame (20) moves in the direction of the optical axis over the two different zones of the collapsing zone and power varying zone. The third and fourth lens frames (30, 40) move in the direction of the optical axis over the power varying zone alone.

The first cam groove 61B causing the first lens frame (10) to move is cut in a concave form in the outer circumference of the cam cylinder 60B. The first cam groove 61B has grooves in the power varying zone and collapsing zone delineated by continuous cam curves. The second, third, and fourth cam grooves causing the second, third, and fourth lens frames (20, 30, 40) to move are arranged with a given space between each pair of them relative to each cam curve serving as a center. The second, third, and fourth cam grooves are each realized with a pair of convex parts jutting inward from the cam cylinder 60B.

The second cam groove causing the second lens frame (20) to move is different from the first cam groove 61B. The second cam groove is divided into two portions of a first cam groove 60Ba lying in the power varying zone and a second cam groove 60Bb lying in the collapsing zone.

The first cam groove 60Ba of the second cam groove is cut only in the power varying zone defined between an extreme telephotographic position T1 and extreme wide-angle position W1 on the cam curve. The first cam groove 60Ba is open beyond the extreme wide-angle position W1. This means that no groove is cut in the collapsing zone. On the other hand, the second cam groove 60Ba of the second cam groove is cut only in the collapsing zone defined between an extreme wide-angle position W2 and stored position C2 on the cam curve. No groove is cut in the power varying zone beyond the extreme wide-angle position W2. Thus, the two extreme wide-angle positions W1 and W2 are defined in the cam grooves 60Ba and 60Bb respectively.

Moreover, the third cam groove causing the third lens frame (30) to move is divided into two portions of a first cam groove 60Bc lying in the power varying zone and a second cam groove 60Bb lying in the collapsing zone. The relationship between the first cam groove 60Bc and second cam groove 60Bd is identical to that of the first and second cam grooves constituting the second cam groove. Incidentally, the collapsing zone is formed with a parallel cam.

The fourth cam groove causing the fourth lens frame (40) to move is, like the first cam groove, delineated in the power varying zone and collapsing zone by continuous cam curves. The collapsing zone is, like that having the third cam groove, formed with a parallel cam.

As mentioned above, in the aforesaid conventional zoom lens barrel (See FIG. 10), the extreme telephotographic position T1 in the first cam groove 161 and the extreme wide-angle position W in the second cam groove 162 have a relationship that they nearly coincide with each other while lying in the outer and inner circumferences of the cam cylinder 60 respectively. The same applies to the stored position C in the first cam groove 141 and the extreme telephotographic position T3 in the third cam groove 163.

However, in this embodiment, the second cam groove causing the second lens frame (20) to move and the third cam groove causing the third lens frame (30) to move are each divided into two portions lying in the power varying zone Zu and collapsing zone Co respectively. The second and third cam grooves are thus arranged adroitly on the cam cylinder 60B for fear they might overlap while lying in the inner and outer circumferences of the cam cylinder 60B.

A cam pin 10Ba formed on the first lens frame (10) is engaged with the first cam groove 61B. A first cam pin 20Ba and second cam pin 20Bb formed on the second lens frame (20) are engaged with the first cam groove 60Ba and second cam groove 60Bb constituting the second cam groove.

Furthermore, a first cam pin 30Ba and second cam pin 30Bb formed on the third lens frame (30) are engaged with the first cam groove 60Bc and second cam groove 60Bd constituting the third cam groove. A cam pin 40Ba formed on the fourth lens frame (40) is engaged with the fourth cam groove 60Be. The other components are identical to those of the first embodiment.

Movements to be made by the thus structured zoom lens barrel of this embodiment will be described below.

When the main power supply of the camera is turned on, the cam cylinder 60B turns responsively in the same manner as that in the first embodiment. The lens frames placed in the collapsed state (stored positions) are interlocked with one another and automatically moved to the extreme wide-angle positions so as to thus enter the ready-to-photograph state. The first lens frame (10) moves towards an object (in the direction of the optical axis) owing to the second cam pin 20Bb. The second cam pin 20Bb is engaged or borne with or by the second cam groove 60Bb of the cam cylinder 60B. That is to say, the lens frame (10) moves to the given extreme wide-angle position so as to enter the ready-to-photograph state.

Concurrently, the second lens frame (20) moves to the extreme wide-angle position W2 while being guided along the second cam groove 60Bb by the second cam pin 20Bb. Moreover, the third lens frame (30) turns while being guided along the second cam groove 60Bd by the second cam pin 30Bb, but does not move in the direction of the optical axis. The fourth lens frame (40) turns while being guided along the fourth cam groove 60Be, but does not, like the third lens frame (30), move in the direction of the optical axis.

In this case, the first cam pin 20Ba of the second lens frame (20) moves in a space above the portion of the cam cylinder 60B devoid of a cam groove. Immediately before the second cam pin 20Bb reaches the extreme wide-angle position W2, the first cam pin 20Ba enters the first cam groove 60Ba through one end thereof and reaches the extreme wide-angle position W1. The first cam pin 20Ba thus moves from the stored position C1 to the extreme wide-angle position W1.

At the same time, the first cam pin 30Ba of the third lens frame (30) moves in a space above the portion of the cam cylinder 60B devoid of a cam groove. Immediately before the second cam pin 30Bb reaches the extreme wide-angle position W11, the first cam pin 30Ba enters the first cam groove 60Bc through one end thereof and reaches the extreme wide-angle position W11. Thus, the first cam pin 30Ba moves from the stored position C11 to the extreme wide-angle position W11.

Positioning the first cam pins 20Ba and 30Ba at the extreme wide-angle positions W1 and W11 respectively is dominated by the combination of the first cam groove 61B and cam pin 10Ba. Immediately before the first cam pins 20Ba and 30Ba reach the extreme wide-angle positions W1 and W11 respectively, the second cam pins 20Bb and 30Bb must be disengaged from the second cam grooves 60Bb and 60Bd. The lengths of the second cam grooves 60Bb and 60Bd are determined to satisfy this requirement.

Thus, the camera is brought to the ready-to-photograph mode.

When the camera is in the photographic mode, a photographer performs given manipulations for varying the power. This causes the second lens frame (20) to move in the direction of the optical axis while being guided along the first cam groove 60Ba by the first cam pin 20Ba. The third lens frame (30) moves in the direction of the optical axis while being guided along the first cam groove 60Ba by the first cam pin 30Ba. The fourth lens frame (40) moves in the direction of the optical axis along the fourth cam groove 60Be.

In this case, the second cam pins 20Bb and 30Bb move in the same manner as the aforesaid first cam pins 20Ba and 30Ba moving from the stored positions C1 and C11 to the extreme wide-angle positions W1 and W11. Specifically, the second cam pins 20Bb and 30Bb move in a space above the portion of the cam cylinder 60B devoid of a cam groove. The movements are identical to those of the first cam pins 20Ba and 30Ba. The second cam pins 20Bb and 30Bb move from the extreme wide-angle positions W2 and W12 to the extreme telephotographic positions T2 and T12.

On the other hand, the first lens frame (10) turns along the first cam groove 61B owing to the cam pin 10Ba but does not move in the direction of the optical axis.

For terminating photography, the main power supply is turned off. This causes the lens frames to move to the extreme wide-angle positions along with the turn of the cam cylinder 60B. The lens frames are automatically returned to the stored positions.

As described above, according to the second embodiment, a cam groove has grooves formed separately in a power varying zone and collapsing zone. Compared with a cam groove formed by cutting grooves continuously in the power varying zone and collapsing zone, the freedom in arranging cam grooves in the power varying zone and collapsing zone on a cam cylinder expands. It becomes easy to arrange cam grooves in such a manner that they will not overlap while lying in the outer and inner circumferences of the cam cylinder. Deterioration of precision in cutting a cam groove caused by a drop or the like can be prevented. While precision in positioning lens frames is maintained, a compact cam member can be realized easily.

In the aforesaid embodiments, a zoom lens barrel of the present invention has been adapted to an electronic camera. Alternatively, the zoom lens barrel may be adapted to a camera employing a silver film or to a video recording/reproducing apparatus such as a video camera capable of recording and reproducing a video signal produced by an imaging device such as a CCD in the form of a motion picture. Even in this case, the same advantages as those mentioned above can be provided.

Moreover, in the aforesaid embodiments, a cam groove is formed by cutting grooves continuously in two zones of a power varying zone and collapsing zone. Alternatively, a macro zooming zone in which macro zooming is carried out may be substituted for the collapsing zone. In this case, a zoom lens barrel is provided with a macro zooming function. The present invention can apply to a wide range of lens barrels having lens frames each moved continuously over two different zones.

Furthermore, a cam groove formed in a cam cylinder in any of the embodiments has a bottom or is a so-called bottomed cam groove. The present invention is not limited to this structure. The present invention can also apply to a penetrating cam groove shaped to penetrate through a wall of a cam cylinder.

According to the present invention, it is apparent that a wide range of embodiments can be constructed based on the invention without a departure from the spirit and scope of the invention. The present invention is limited by the appended claims but not restricted by any specific embodiment.

What is claimed is:

1. A zoom lens barrel, comprising:

a cam member having a first cam groove and second cam groove formed therein;

a lens frame having a first cam pin to be engaged with said first cam groove, and a second cam pin to be engaged with said second cam groove, wherein when said first cam pin formed on said lens frame moves under control of said first cam groove, said lens frame moves over a first zone in the direction of an optical axis of photographic lenses; and wherein said second cam pin formed on said lens frame moves under control of said second cam groove, said lens frame moves over a second zone in the direction of the optical axis.

2. A zoom lens barrel according to claim 1, wherein said first zone is a power varying zone over which said lens frame is moved in order to change the focal length of photographic state, and said second zone is a collapsing zone over which said lens frame is moved in order to move said photographic lenses to stored positions in a non-photographic state or from the stored positions to photographic-state positions.

3. A zoom lens barrel according to claim 2, wherein said cam member is a cam cylinder shaped substantially like a cylinder that turns with the optical axis of said photographic lenses as a center.

4. A zoom lens barrel, comprising:

a cam member having a first cam groove and second cam groove formed continuously therein;

a lens frame having a first cam pin to be engaged with said first cam groove, and a second cam pin to be engaged with said second cam groove, wherein when said first cam pin formed on said lens frame moves under control of said first cam groove, said lens frame moves over a first zone in the direction of an optical axis of photographic lenses; and when said second cam pin formed on said lens frame moves under control of said second cam groove, said lens frame moves over a second zone in the direction of the optical axis.

5. A zoom lens barrel according to claim 4, wherein said first zone is a power varying zone over which said lens frame is moved in order to change the focal length of photographic lenses in a photographic state, and said second zone is a collapsing zone over which said lens frame is moved to move said photographic lenses to stored positions in a non-photographic state or from the stored positions to photographic-state positions.

6. A zoom lens barrel according to claim 5, wherein said cam member is a cam cylinder shaped substantially like a cylinder that turns with the optical axis of said photographic lenses as a center.

7. A zoom lens barrel according to claim 6, wherein said first cam pin is engaged with said first cam groove in said power varying zone, and said second cam pin is engaged with said second cam groove in said collapsing zone.

8. A zoom lens barrel according to claim 6, wherein said first cam pin is engaged with said first cam groove in said power varying zone, and said second cam pin is engaged with said second cam groove mainly in said collapsing zone, and said first cam pin and second cam pin are engaged with said associated cam grooves near a junction between said power varying zone and collapsing zone.

9. A zoom lens barrel according to claim 7 or 8, wherein said first cam groove is composed of a first cam groove power varying portion lying in said power varying zone and a passage portion through which said first cam pin passes with a backlash retained and which lies in said collapsing zone, and said second cam groove is composed of a second cam groove collapsing portion lying in said collapsing zone, and a passage portion through which said second cam pin passes with a backlash retained and which lies in said power varying zone.

10. A zoom lens barrel according to claim 4, wherein said first cam groove is composed of a first zone portion that is a parallel cam groove not causing a lens frame to move in the direction of the optical axis and that lies in said first zone, and a second zone portion lying in said second zone, and said second cam groove has said portion, which lies in said second zone, formed continuously to said first zone portion of said first cam groove.

11. A zoom lens barrel according to claim 9 or 10, wherein the portions of said first cam pin and second cam pin engaged with said cam grooves are mutually different.

12. A zoom lens barrel according to claim 9, wherein said first cam groove and second cam groove are formed parallel to each other with a certain distance between them in the direction of the optical axis in the cylindrical surface of said cam member.

13. A zoom lens barrel according to claim 9, wherein grooves communicating with said first cam groove and second cam groove are formed in said cam cylinder in such a manner that they extend from an end of said cam cylinder.

14. A zoom lens barrel according to claim 9, wherein said passage portion through which said first cam pin passes with a backlash retained or said passage portion through which said second cam pin passes with a backlash retained is not partly formed.

* * * * *